(12) United States Patent
Sarkar et al.

(10) Patent No.: US 12,136,939 B2
(45) Date of Patent: Nov. 5, 2024

(54) RECEIVER WITH DISTRIBUTED ATTENUATORS

(71) Applicant: Apple Inc., Cupertino, CA (US)

(72) Inventors: Saikat Sarkar, Irvine, CA (US); Xiang Guan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 246 days.

(21) Appl. No.: 17/667,187

(22) Filed: Feb. 8, 2022

(65) Prior Publication Data

US 2023/0254001 A1 Aug. 10, 2023

(51) Int. Cl.
*H04B 1/18* (2006.01)
*H04B 1/16* (2006.01)

(52) U.S. Cl.
CPC ............. *H04B 1/18* (2013.01); *H04B 1/1607* (2013.01); *H04B 1/1638* (2013.01)

(58) Field of Classification Search
CPC ....... H04B 1/1607; H04B 1/1638; H04B 1/18
See application file for complete search history.

(56) References Cited

U.S. PATENT DOCUMENTS

| | | | |
|---|---|---|---|
| 6,781,454 B1 | 8/2004 | Kirkman | |
| 6,941,122 B2 | 9/2005 | Shim | |
| 7,154,329 B2 | 12/2006 | Douglas | |
| 9,912,303 B2 | 3/2018 | Barton et al. | |
| 2002/0187766 A1* | 12/2002 | Shim | H03F 3/45475 455/234.1 |
| 2016/0020742 A1* | 1/2016 | Maynard | H03G 3/002 375/345 |

OTHER PUBLICATIONS

W. Gosling, "Voltage controlled attenuators using field effect transistors," in IEEE Transactions on Audio, vol. AU-13, No. 5, pp. 112-120, Sep.-Oct. 1965, doi: 10.1109/TAU.1965.1161818. (Year: 1965).*

* cited by examiner

*Primary Examiner* — Nader Bolourchi
(74) *Attorney, Agent, or Firm* — FLETCHER YODER PC

(57) ABSTRACT

This disclosure is directed to power gain variation compensation of Radio Frequency (RF) receivers based on temperature variations. An RF receiver may include amplification circuitry having a chain of multiple amplifiers and/or passive elements. Multiple distributed and/or lumped attenuators disposed at different points between amplifiers and/or passive elements of the chain may attenuate a received RF signal to compensate for gain variations of the multiple amplifiers and/or passive elements caused by a temperature change. Accordingly, the distributed and/or lumped attenuators may improve linear response of the amplifiers and/or passive elements and signal-to-noise and distortion ratio of RF signals received at the receiver.

20 Claims, 5 Drawing Sheets

RECEIVER WITH DISTRIBUTED ATTENUATORS

BACKGROUND

The present disclosure relates generally to wireless communication, and more specifically to gain variation in receiving circuitry of wireless communication devices.

In a wireless communication device, a receiver may be coupled to one or more antennas to enable the device to receive wireless signals. The receiver may include amplification circuitry, including low noise amplifiers (LNAs), that amplify received signals to a level above a noise floor so that the signals may be used for additional processing (e.g., at processing circuitry of the device). However, temperature variation may impact performance of the amplification circuitry. For example, an LNA may apply a different amplification factor to a received signal at different temperatures.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device is described. The electronic device may include one or more antennas configured to receive radio frequency signals. The electronic device may also include receiver circuitry coupled to the one or more antennas to amplify the radio frequency signals received by the one or more antennas. The receiver circuitry may include multiple amplifiers coupled in series using multiple transmission lines. Each of the multiple amplifiers and the multiple transmission lines may amplify the radio frequency signals based on a gain and a gain variation based on temperature. The electronic device may also include multiple distributed attenuators. A first distributed attenuator of the multiple distributed attenuators may be disposed on a first transmission line between a first amplifier and a second amplifier of the multiple amplifiers. The first amplifier and the second amplifier may be coupled in series via the first transmission line. Moreover, the first distributed attenuator may attenuate the radio frequency signals by a first gain attenuation based on the temperature to compensate for a first portion of a cumulative gain variation of the multiple amplifiers and the multiple transmission lines, the first portion of the cumulative gain variation associated with the first amplifier, the second amplifier, the first transmission line, or a combination thereof.

In another embodiment, radio frequency receiver circuitry is described. The radio receiver circuitry may include multiple amplifiers coupled in series. Each of the multiple amplifiers may amplify radio frequency signals received by antenna circuitry based on a gain and a gain variation based on temperature. The multiple amplifiers may amplify the radio frequency signals based on a cumulative gain of each of the plurality of amplifiers. Multiple distributed attenuators may couple to the multiple amplifiers respectively. Each of the distributed attenuator may compensate for at least a portion of a cumulative gain variation of the multiple amplifiers based on the temperature.

In yet another embodiment, a method is described. The method includes receiving one or more temperatures of multiple amplifiers of a radio frequency receiver circuitry by a controller of the radio frequency receiver circuitry. The controller may determine that a first temperature of the one or more temperatures of a first amplifier is below a high temperature threshold. Moreover, the controller may determine that the first amplifier of the multiple amplifiers includes an increased gain based on the first temperature being below the high temperature threshold. Furthermore, the controller may provide one or more control signals to increase a gain attenuation of a first distributed attenuator of multiple distributed attenuators of the radio frequency receiver circuitry associated with the first amplifier to compensate for the increased gain based on the first temperature.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
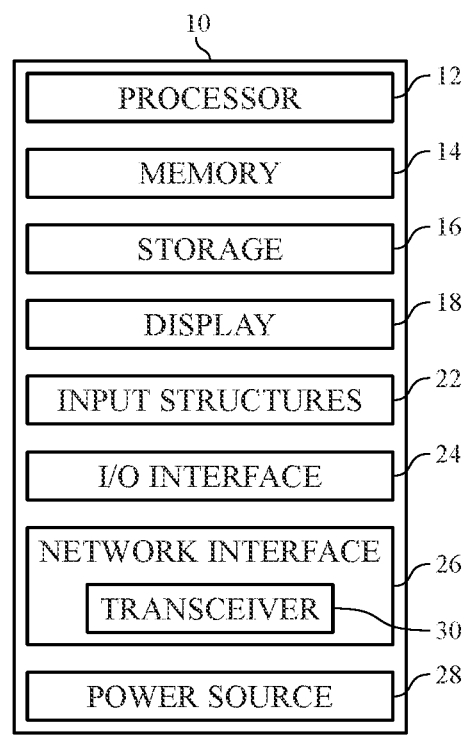
FIG. 1 is a block diagram of an electronic device, according to embodiments of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to power gain variation compensation of radio frequency (RF) receivers based on temperature variations. RF circuitry of a wireless communication device (e.g., a smartphone) may include one or more antennas and one or more RF receivers having one or more RF mixers, among other circuitry/components. The one or more antennas may provide received signals (e.g., RF signals) to the one or more RF receivers. Moreover, an RF receiver may include amplification circuitry that amplifies the signals and/or shifts a frequency of the signals before providing the signals to the RF mixer. Subsequently, the RF mixer may provide the signals (e.g., amplified and/or shifted signals) to downstream components of the receiver and/or device for processing. For example, the downstream components may include processing circuitry of the wireless communication device.

The RF receiver may include a cascaded chain of amplifiers and transmission lines for amplifying and/or shifting the signals. In some cases, multiple amplifiers may be coupled in series using the transmission lines. Moreover, in some embodiments, the RF receiver may amplify the signals based on a cumulative gain (e.g., power gain) of the amplifiers and the transmission lines of the RF receiver. Subsequently, the RF receiver may provide the signals to the RF mixer. For example, each of the amplifiers and the transmission lines of the RF receiver may amplify the signals by applying a respective gain. However, the gain of some of the amplifiers and the transmission lines of the RF receiver may change based on a change in temperature (e.g., a gain variation). Accordingly, the cumulative gain of the RF receiver may change based on a cumulative gain variation of each of the amplifiers and the transmission lines coupled in series.

The gain variation of the amplifiers and the transmission lines of the RF receiver due to temperature may reduce a signal to noise and distortion ratio (SNDR) of the RF receiver. For example, lower temperatures may cause a gain of the amplifiers and the transmission lines to increase. At the same time, the lower temperatures may cause a signal distortion ratio (SDR) and/or a Third-Order Intercept Point (IIP3) of the amplifiers to worsen. As such, the lower temperatures may worsen nonlinear responses of the amplifiers, and thus an overall nonlinear response of the RF receiver.

Additionally, higher temperatures may cause power gains of the amplifiers and/or the transmission lines to decrease, which may worsen a noise factor (NF) and a signal to noise ratio (SNR) of the amplifiers. As such, if not compensated for, the gain variations of components of the RF receiver due to temperature may accumulate and reduce the SNDR and/or overall performance of the RF receiver.

With the foregoing in mind, the RF receiver may include circuitry to compensate for the gain variations of the amplifiers and the transmission lines due to temperature. For example, the RF receiver may include a number of attenuators to compensate for at least some of the gain variations of at least some of the amplifiers and the transmission lines. Each attenuator may apply a dynamic range of attenuation for compensating for the gain variations. In some cases, controller and/or processing circuitry of the electronic device may provide one or more control signals to adjust the attenuation of each of the attenuators. For example, the controller circuitry may use a lookup table to provide the one or more control signals based on the temperature.

In some embodiments, the RF receiver may include one or more variable attenuators to compensate for the gain variations of multiple amplifiers and transmission lines of the RF receiver due to temperature. For example, a variable or "lumped" attenuator may compensate for the cumulative gain variation of the multiple amplifiers and/or the transmission lines due to temperature (e.g., a lumped attenuator). Moreover, the variable attenuator may provide variable attenuation via variable resistors. In some cases, the variable attenuator may apply a dynamic range of attenuation for compensating for the gain variations of the multiple amplifiers and transmission lines due to temperature. The variable attenuator may be disposed in series with the amplifiers and the transmission lines of the RF receiver.

The variable attenuator may correlate to or match an impedance of the RF receiver while maintaining a low gain attenuation error and a viable frequency response to the signals. However, the variable attenuator may include a high minimum gain loss when idle (e.g., when the attenuation is adjusted to 0 decibels (dB) by the control signals). In some cases, the variable attenuators may worsen the NF and/or SNR of the signals when disposed closer to the one or more antennas in the cascaded chain of amplifiers. Moreover, the variable attenuators may worsen the SDR and linear response of the signals when disposed closer to the RF mixer in the cascaded chain of amplifiers.

In different embodiments, the RF receiver may include multiple distributed attenuators to compensate for the gain variations of the amplifiers and the transmission lines of the RF receiver due to temperature. In some cases, the distributed attenuators may apply a smaller dynamic range of attenuation for compensating for the gain variations across temperature compared to the variable attenuators. However, the distributed attenuators may include a low minimum gain loss (e.g., 0 dB, nearly 0 dB) when idle (e.g., when the attenuation is adjusted to 0 dB by the control signals).

For example, each distributed attenuator may at least partially compensate for the gain variations of one or more amplifiers and/or transmission lines of the RF receiver due to temperature. Moreover, the controller circuitry may provide the control signals to the multiple distributed attenuators to compensate for gain variations at different nodes of the RF receiver. Accordingly, the RF receiver may use the multiple distributed attenuators to improve the linear response and SNDR of the RF receiver.

In additional or alternative embodiments, the RF receiver may include one or more variable attenuators and multiple distributed attenuators to compensate for the cumulative gain variations of the RF receiver across temperature. In such embodiments, the lumped and distributed attenuators may each compensate for a portion of the cumulative gain variations of the RF receiver across temperature. Moreover, the controller circuitry may provide the control signals to the variable attenuators and the distributed attenuators to adjust the respective attenuations of received RF signals. The variable attenuators may correlate to or match an impedance of the RF receiver, maintain a low gain attenuation error, and maintain a viable frequency response to the signals. The distributed attenuators may improve the linear response and SNDR of the RF receiver while having a low minimum gain loss (e.g., 0 dB, near 0 dB) when idle.

FIG. 1 is a block diagram of an electronic device 10 (e.g., a wireless communication device, a mobile communication device, a smartphone, and so on), according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the I/O interface 24, the network interface 26, and/or the power source 28 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, Calif.), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with the memory 14 and the nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 28 of the electronic device 10 may include any suitable source of power, such as a rechargeable lithium polymer (Li-poly) battery and/or an alternating current (AC) power converter.

Figure 2:
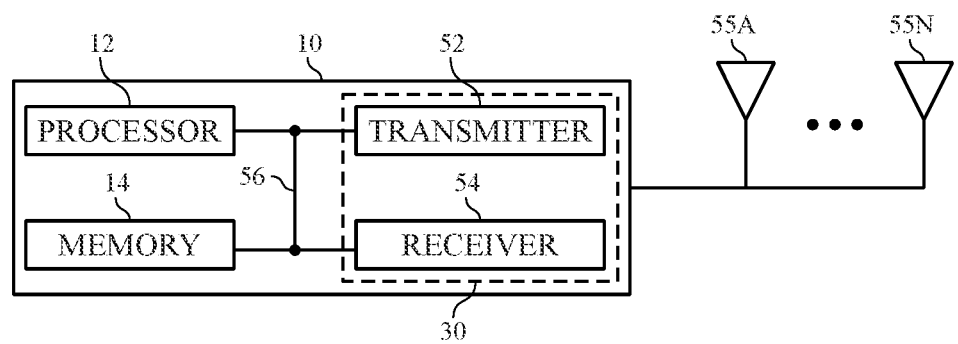
FIG. 2 is a block diagram of a transceiver of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, and/or a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on.

Each antenna 55 may be associated with one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
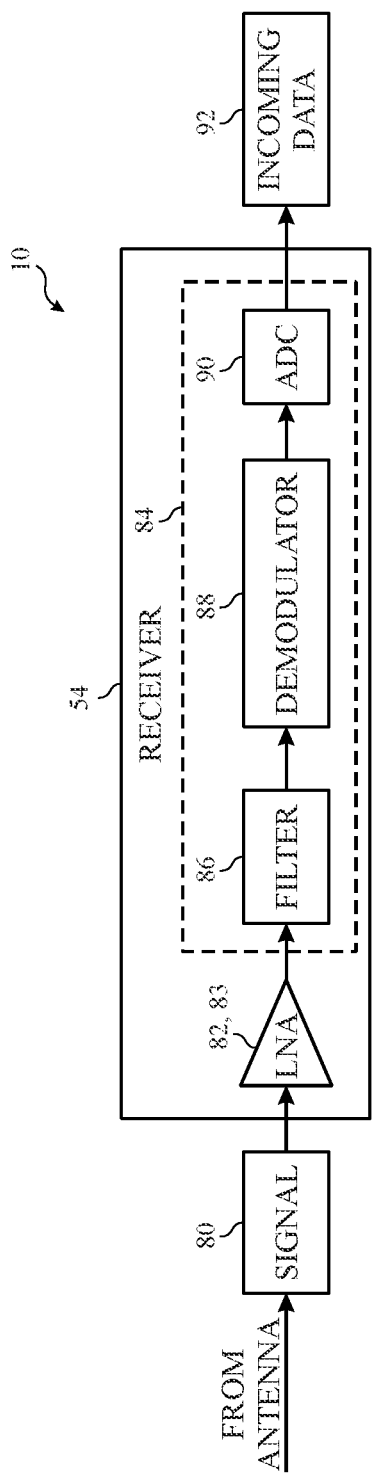
FIG. 3 is a block diagram of a receiver of the electronic device of FIGS. 1 and 2, according to embodiments of the present disclosure.

FIG. 3 is a schematic diagram of the receiver 54 (e.g., receive circuitry), according to embodiments of the present disclosure. As illustrated, the receiver 54 may receive received data from the one or more antennas 55 in the form of a signal 80 (e.g., an analog signal). Amplification circuitry 82 may amplify the received signal 80 to a suitable level for the receiver 54 to process. In particular, the amplification circuitry 82 may amplify the signal 80 by applying a gain (e.g., a power gain) to the signal 80. As illustrated, the amplification circuitry 82 may include one or more low noise amplifiers (LNAs) 83, though the amplification circuitry 82 may also include one or more passive components (e.g., transmission lines, routing circuitry, phase shifters, and so on).

As an example, the amplification circuitry 82 may include multiple amplifiers (e.g., LNAs 83) coupled in series using multiple transmission lines. Moreover, each of the amplifiers and the transmission lines of the amplification circuitry 82 may apply a respective gain (e.g., a power gain) to the received signal 80. Accordingly, each of the amplifiers and the transmission lines of the amplification circuitry 82 may provide a portion of the total gain applied by the amplification circuitry 82.

The amplification circuitry 82 may also include multiple attenuators, as discussed in further detail below. For example, a gain of each of the amplifiers and the transmission lines may change based on a change in temperature. Accordingly, in different embodiments, the amplification circuitry 82 may include a number of distributed attenuators, variable attenuators, or both, to compensate for the gain variations of the amplifiers and the transmission lines caused by a temperature change, as will be appreciated.

In any case, the amplification circuitry 82 may provide the amplified signal 80 to an RF mixer 84. The RF mixer 84 may include a filter 86 (e.g., filter circuitry and/or software), a demodulator 88, and an analog to digital converter (ADC) 90. In different embodiments, the filter 86 may include filter circuitry, filtering software, or both. The filter 86 may receive the amplified signal from the amplification circuitry 82. The filter 86 may remove undesired noise from the received signal, such as cross-channel interference. The filter 86 may also remove additional signals received by the one or more antennas 55 that are at frequencies other than the desired signal. Moreover, the filter 86 may include any suitable filter or filters to remove the undesired noise or signals from the received signal, such as a bandpass filter, a bandstop filter, a low pass filter, a high pass filter, and/or a decimation filter.

The demodulator 88 may remove a radio frequency envelope and/or extract a demodulated signal from the filtered signal for processing. The ADC 90 may receive the demodulated analog signal and convert the signal to a digital signal of incoming data 92 to be further processed by the electronic device 10. Additionally, the receiver 54 may include any suitable additional components not shown, or may not include certain of the illustrated components, such that the receiver 54 may receive the received signal 80 via the one or more antennas 55. For example, the receiver 54 may include a mixer component and/or a digital down converter.

Figure 4:
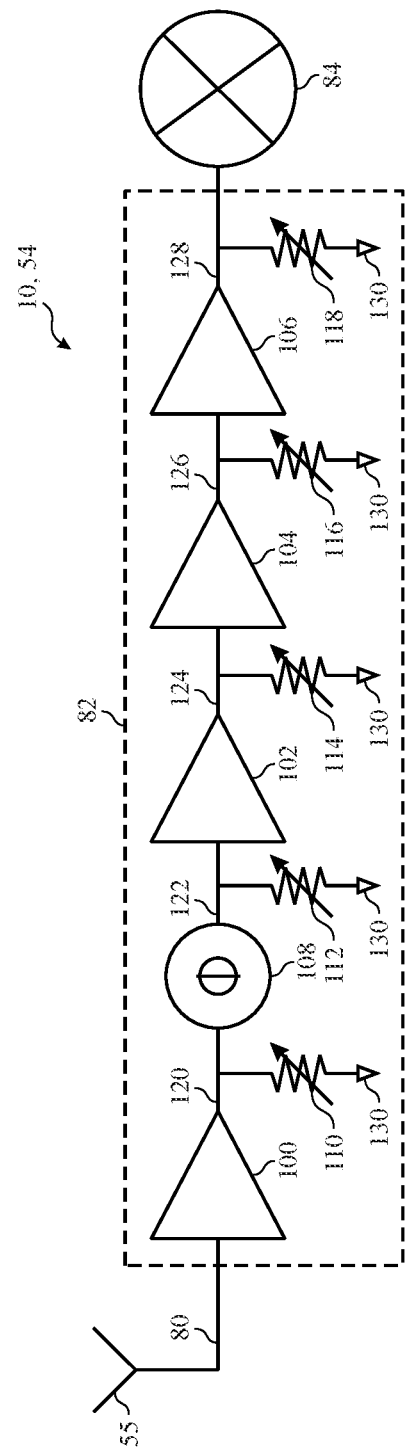
FIG. 4 is a schematic diagram of an amplification circuitry of the receiver of FIG. 3 including multiple distributed attenuators, according to embodiments of the present disclosure.

FIG. 4 is a schematic diagram of an amplification circuitry of the receiver of FIG. 3 including multiple distributed attenuators. The amplification circuitry 82 may include amplifiers 100, 102, 104, and 106, passive elements 108, and distributed attenuators 110, 112, 114, 116, and 118. In the depicted embodiment, the amplifiers 100, 102, 104, and 106 and the passive elements 108 are coupled in series. As such, the amplification circuitry 82 may amplify the signal 80 based on the cumulative gain and gain variation of the cascaded amplifiers 100, 102, 104, and 106 and the passive elements 108. Moreover, the distributed attenuators 110, 112, 114, 116, and 118 are coupled between a ground 130 and nodes 120, 122, 124, 126, and 128 respectively. Each of the amplifiers 100, 102, 104, and 106 and the passive elements 108 may amplify the signal 80, received by the antenna 55, based on a respective gain. For example, each of the amplifiers 100, 102, 104, and 106 and the passive elements 108 may provide a portion of the gain of the amplification circuitry 82.

In some cases, the passive elements 108 (illustrated as a phase shifter) may include one or more transmission lines, routing circuitry, phase shifters, and/or other elements of the amplification circuitry 82 that receive energy (e.g., and do not supply energy to the amplification circuitry 82). Moreover, one or more of the nodes 120, 122, 124, 126, and 128 may correspond to transmission lines, routing circuitry, and/or connection nodes coupling the amplifiers 100, 102, 104, and 106 and the passive elements 108. In particular, the nodes 120, 122, 124, 126, and 128 may include differential transmission lines, routing circuitry, and/or connection nodes. Furthermore, while the depicted embodiment of the amplification circuitry 82 in FIG. 4 includes a specific number of amplifiers, distributed attenuators, and passive components (e.g., transmission lines), it should be understood that the amplification circuitry 82 may include a different number (e.g., more or less) of amplifiers, distributed attenuators, and passive components in different embodiments.

In any case, a temperature change to the elements of the amplification circuitry 82 (e.g., the amplifiers 100, 102, 104, and 106 and the passive elements 108) may cause a gain variation as applied by at least some of the elements. For example, an initial or standard gain of each of the elements may correspond to a gain of the respective elements at a specific temperature (e.g., room temperature, approximately 20° Celsius (C) to 30° C., such as 25° C., or any other suitable initial or standard temperature). For example, the specific temperature may correspond to a testing temperature associated with the manufacturing facility of the electronic device 10 or the amplification circuitry 82. Moreover, a total gain of each of the elements, when the amplification circuitry 82 is in operation, may correspond to the initial or standard gain of the respective elements, plus the gain variation for each element that is caused by a change in the temperature (e.g., from the specific temperature).

For example, a higher temperature (e.g., than the specific temperature) may cause a negative gain variation (e.g., -dB) of each of the amplifiers 100, 102, 104, and 106 and/or the passive elements 108, decreasing the initial or standard gain of each of the amplifiers 100, 102, 104, and 106 and/or the passive elements 108. Accordingly, the higher temperature may decrease the total gain of the amplification circuitry 82. Moreover, a lower temperature (e.g., lower than the specific temperature) may cause a positive gain variation (e.g., +dB) of each of the amplifiers 100, 102, 104, and 106 and the passive elements 108, increasing the initial or standard gain of each of the amplifiers 100, 102, 104, and 106 and/or the passive elements 108. Accordingly, the lower temperature may increase the total gain of each of the amplification circuitry 82.

In some embodiments, each of the distributed attenuators 110, 112, 114, 116, and 118 may apply a dynamic range of gain attenuation to compensate for a range of gain variation of one respective amplifier 100, 102, 104, or 106 or the passive elements 108. In alternative or additional embodiments, each of the distributed attenuators 110, 112, 114, 116, and 118 may apply a respective dynamic range of gain attenuation to compensate for a respective portion of a cumulative gain variation of the amplifiers 100, 102, 104, and 106, and/or the passive elements 108.

In a specific example, the distributed attenuator 110 may compensate for gain variation of (e.g., attenuate a positive gain variation of) the amplifier 100. The distributed attenuator 110 may apply a dynamic range of gain attenuation based on the range of gain variation of the amplifier 100. Moreover, the distributed attenuator 112 may compensate for gain variation of the passive elements 108. The distributed attenuator 112 may apply a dynamic range of gain attenuation based on the range of gain variation of the passive elements 108. Also, the distributed attenuator 114 may compensate for gain variation of the amplifier 102. The distributed attenuator 114 may apply a dynamic range of gain attenuation based on the range of gain variation of the amplifier 102.

Moreover, the distributed attenuator 116 may compensate for gain variation of the amplifier 104. The distributed attenuator 116 may include a dynamic range of gain attenuation based on the range of gain variation of the amplifier 104. Furthermore, the distributed attenuator 118 may compensate for gain variation of the amplifier 106. The distributed attenuator 118 may include a dynamic range of gain attenuation based on the range of gain variation of the amplifier 106. That said, in alternative or additional embodiments, the dynamic range of gain attenuation of each of the distributed attenuators 110, 112, 114, 116, and 118 may correspond to a at least a portion of a cumulative range of gain variation of the amplification circuitry 82.

In any case, a controller circuitry, such as the processor 12, may provide control signals to the distributed attenuators 110, 112, 114, 116, and 118. In some cases, the processor 12 may transmit the control signals using a multi-bit unary (e.g., a 3-bit unary) implementation for progressively turning on and off one or multiple of the distributed attenuators 110, 112, 114, 116, and 118, either completely or partially, to increase or decrease attenuation. For example, the processor 12 may transmit a 3-bit unary control signal to increase (or decrease) the attenuation by 0.5 dB or less, 1 dB or less, 2 dB or less, 3 dB or less, 5 dB or less, 10 dB or less, and so on. The processor 12 may provide the control signals based on the temperature of the amplifiers 100, 102, 104, and/or 106 and/or the passive elements 108. As mentioned above, the temperature change of each of the amplifiers 100, 102, 104, and/or 106 and/or the passive elements 108 may cause a gain variation of the respective amplifiers 100, 102, 104, and/or 106, and/or the passive elements 108.

Accordingly, the processor 12 may provide the control signals to adjust a gain attenuation of each of the distributed attenuators 110, 112, 114, 116, and 118 based on (e.g., to compensate for) the respective gain variation of the amplifiers 100, 102, 104, and/or 106, and/or the passive elements 108 caused by the temperature change. For example, a first control signal may cause the distributed attenuator 110 to compensate for a first gain variation, a second control signal may cause the distributed attenuator 112 to compensate for a second gain variation, and so on. Moreover, in some cases, the processor 12 may transmit a multi-bit command signal to one or multiple of the distributed attenuators 110, 112, 114, 116, and 118 to, for example, progressively turn on or off one or multiple of the distributed attenuators 110, 112, 114, 116, and 118 based on temperature.

In the specific example discussed above, the processor 12 may operate the distributed attenuator 110 by sending control signals based on the temperature of the amplifier 100. The processor 12 may also operate the distributed attenuator 112 by sending control signals based on the temperature of the passive elements 108. Moreover, the processor 12 may operate the distributed attenuator 114 by sending control signals based on the temperature of the amplifier 102. Furthermore, the processor 12 may operate the distributed attenuator 116 by sending control signals based on the temperature of the amplifier 104, and operate the distributed attenuator 118 by sending control signals based on the temperature of the amplifier 106.

In some cases, the processor 12 may use a lookup table (e.g., stored in the memory 14 and/or the storage device 16) to provide the control signals to the distributed attenuators 110, 112, 114, 116, and 118 based on the temperature. The lookup table may include values for adjusting the gain attenuation of each of the distributed attenuators 110, 112, 114, 116, and 118 that correspond to the temperature of the associated amplifiers 100, 102, 104, and/or 106, and/or the passive elements 108. In some embodiments, the lookup table may include a different set of values for adjusting the gain attenuation of each of (or some of) the distributed attenuators 110, 112, 114, 116, and/or 118, as each attenuator may have different operating characteristics, undergone different manufacturing procedures, and so on, from another.

To determine the temperature of the amplifiers 100, 102, 104, and/or 106, and/or the passive elements 108, the receiver 54 and/or the amplification circuitry 82 may include a number of temperature sensors. In some cases, the amplification circuitry 82 may include a temperature sensor (e.g., a thermocouple, resistance temperature detector, thermistor, and so on) associated with each of the amplifiers 100, 102, 104, and/or 106, and/or the passive elements 108. In alternative cases, the amplification circuitry 82 may include a temperature sensor associated with one or more of the amplifiers 100, 102, 104, and/or 106, and/or the passive elements 108. In any case, the processor 12, or any other viable circuitry, may receive and/or determine a temperature of each of the amplifiers 100, 102, 104, and/or 106, and/or the passive elements 108 based on receiving temperature information from the one or multiple temperature sensors.

When receiving a temperature equal to or above a threshold temperature (e.g., 25° C. or greater, 30° C. or greater, 40° C. or greater, 50° C. or greater, 60° C. or greater, 65° C. or greater, 100° C. or greater, and so on) at one or more of the amplifiers 100, 102, 104, and/or 106 and/or the passive elements 108, the processor 12 may provide the control signals to idle one or more of the distributed attenuators 110, 112, 114, 116, and/or 118 that correspond to the one or more of the amplifiers 100, 102, 104, and/or 106 and/or the passive elements 108 operating at or above the threshold temperature (e.g., such that the idled attenuator(s) is not in operation and/or not attenuation an RF signal). As mentioned above, a higher temperature (e.g., higher than an initial or standard temperature) may cause a negative gain variation (e.g., -dB) that may reduce a gain of one or more of the amplifiers 100, 102, 104, and 106 and the passive elements 108. Accordingly, it may be undesirable to attenuate (e.g., or decrease) gain variation of the amplifiers 100, 102, 104, and/or 106, and/or the passive elements 108 operating at the temperature equal to or above the threshold temperature, as the gain variation has already been decreased by this higher temperature.

In one example, one or more of the distributed attenuators 110, 112, 114, 116, and/or 118 may include a 3 dB (or near 3 dB) range of gain attenuation (e.g., -3 dB of maximum gain attenuation), including zero or near zero gain attenuation when idled. Moreover, the gain variation of at least some of the amplifiers 100, 102, 104, and 106 and the passive elements 108 may be +/-1.5 dB (or near +/-1.5 dB) from an initial or standard gain (e.g., measured at a specific temperature, such as room temperature, approximately 20° Celsius (C) to 30° C., such as 25° C., or any other suitable initial or standard temperature). For example, the gain variation of at least some of the amplifiers 100, 102, 104, and 106 and the passive elements 108 may be -1.5 dB at (or above) the threshold temperature. Accordingly, the amplifiers 100, 102, 104, and 106 and the passive elements 108 may amplify the signal 80 based on the respective initial gains in combination with the respective negative gain variation (e.g., -1.5 dB of gain variation) from the respective initial gain at (or above) the threshold temperature.

Moreover, when idled, the distributed attenuators 110, 112, 114, 116, and/or 118 may provide zero or near zero decibels of gain attenuation (e.g., minimum gain attenuation, 0 dB, ~+/-0dB) to the signal 80. As mentioned above, in some cases, each of the distributed attenuators 110, 112, 114, 116, and 118 may compensate for gain variations of one respective amplifier 100, 102, 104, or 106, or the passive elements 108. In such cases, each distributed attenuator 110, 112, 114, 116, or 118 may include a relatively narrow dynamic range of gain attenuation, including a zero or near zero gain attenuation when idled, to compensate for gain variations of one respective amplifier 100, 102, 104, or 106, or the passive elements 108. Accordingly, the idled distributed attenuators 110, 112, 114, 116, and/or 118 may provide zero or near zero decibels of gain attenuation (e.g., minimum gain attenuation, 0 dB, ~+/-0 dB) to the signal 80 based at least in part on having the narrow dynamic range of gain attenuation.

When receiving a temperature below the threshold temperature (e.g., less than 25° C. or greater, 30° C. or greater, 40° C. or greater, 50° C. or greater, 60° C. or greater, 65° C. or greater, 100° C. or greater, and so on), the processor 12 may provide control signals to increase the gain attenuation of one or multiple of the distributed attenuators 110, 112, 114, 116, and/or 118 (e.g., to compensate for the gain variation of the amplifiers 100, 102, 104, and/or 106, and/or the passive elements 108 caused by the temperature being below the threshold temperature). In some cases, the processor 12 may provide the control signals to increase the gain attenuation inversely proportional to the temperature of the component providing the gain attenuation decreasing below the threshold temperature. In one example, the processor 12 may provide the control signals to increase the gain attenuation of the signal 80 by a distributed attenuator 110, 112, 114, 116, or 118 as the temperature of at least one of the amplifiers 100, 102, 104, or 106, or the passive elements 108 decreases below the threshold temperature.

As mentioned above, decreasing a temperature of each of the amplifiers 100, 102, 104, and 106 and the passive elements 108 may cause a positive gain variation (e.g., +dB) of the respective amplifiers 100, 102, 104, and 106 and the passive elements 108. Moreover, the positive gain variation may increase the total gain of the respective amplifiers 100, 102, 104, and 106 and the passive elements 108. Accordingly, the processor 12 may provide the control signals to increase the gain attenuation of the respective distributed attenuators 110, 112, 114, 116, and/or 118 to compensate for the increased total gain of the amplifiers 100, 102, 104, and/or 106, and/or the passive elements 108 based on the decreased temperature.

Figure 5:
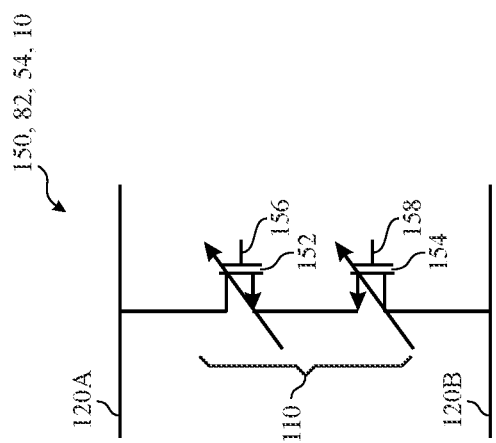
FIG. 5 is a circuit diagram of a distributed attenuator of the amplification circuitry of FIG. 4, according to embodiments of the present disclosure.

FIG. 5 is a circuit diagram of a distributed attenuator of the amplification circuitry of FIG. 4. In different embodiments, the distributed attenuators 112, 114, 116, and/or 118 may be similar or different to the depicted distributed attenuator 110. In the depicted embodiment, the distributed attenuator 110 may be coupled to the node 120 of the amplification circuitry 82. In particular, the distributed attenuator 110 may be differentially coupled between a node 120A (e.g., a positive power supply rail) and a node 120B (e.g., a negative power supply rail).

The distributed attenuator 110 may include a first switch 152 and a second switch 154. In some cases, the first switch 152 and/or the second switch 154 may be configurable to be conductive or non-conductive (e.g., using metal-oxide-semiconductor field-effect transistors (MOSFETs), resistors, or other viable components). Alternatively or additionally, the first switch 152 and/or the second switch 154 may be configurable to provide a variable resistance (e.g., using variable resistance transistors). In any case, the processor 12 may provide a first control signal 156 to the first switch 152 and a second control signal 158 to the second switch 154 (e.g., to respective gates of each MOSFET switch 152, 154). In different cases, the first control signal 156 may partially or fully activate the first switch 152, the second switch 154, or both, to apply a lower or higher attenuation within the dynamic range of gain attenuation of the distributed attenuator 110.

As discussed above, the processor 12 may provide the first control signal 156 and/or the second control signal 158 based on a received and/or determined temperature of the amplifier (e.g., 100). Moreover, the processor 12 may use the look up table to provide the first control signal 156 and/or the second control signal 158 based on the temperature. That is, the lookup table may be indexed by temperature, and may store values corresponding to the temperature that the processor 12 may send via the first control signal 156 and/or the second control signal 158 to the first switch 152 and/or the second switch 154. In specific cases, the processor 12 may adjust the gain attenuation of the distributed attenuator 110 by adjusting a variable resistance of the first switch 152, the second switch 154, or both.

Figure 6:
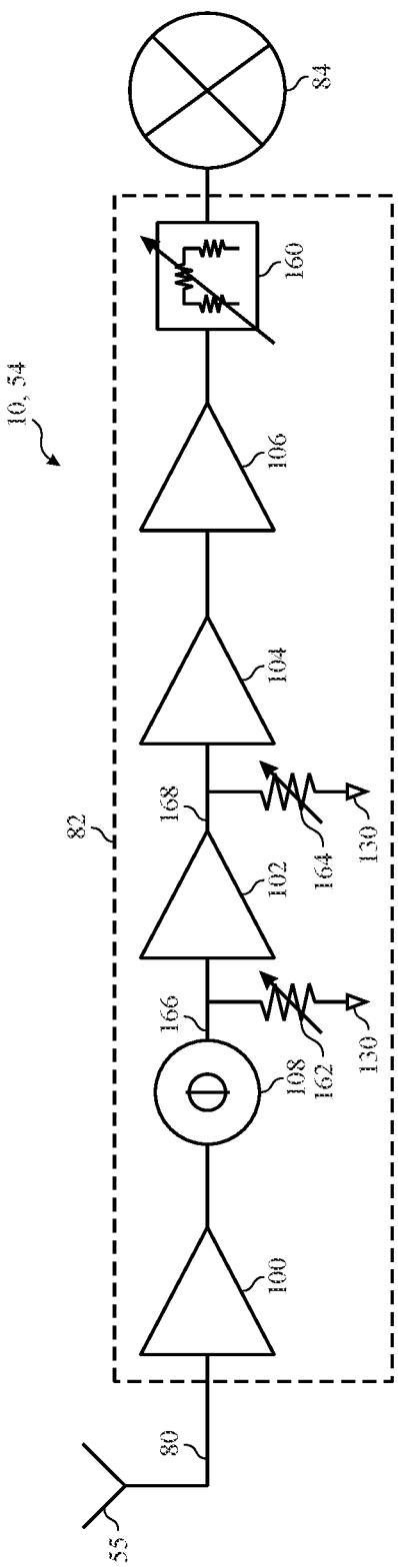
FIG. 6 is a schematic diagram of the amplification circuitry of the receiver of FIG. 3 including multiple distributed attenuators and a variable attenuator, according to embodiments of the present disclosure.

FIG. 6 is a schematic diagram of the amplification circuitry of the receiver of FIG. 3 including multiple distributed attenuators and a variable attenuator. The amplification circuitry 82 may include the amplifiers 100, 102, 104, and 106 and the passive elements 108 coupled in series with a variable attenuator 160 (e.g., a "lumped" attenuator). The processor 12 may provide the control signals to the variable attenuator 160 to compensate for one or more elements of the amplification circuitry 82. The amplification circuitry 82 may include a distributed attenuator 162 coupled to a node 166 disposed between the passive elements 108 and the amplifier 102. The amplification circuitry 82 may also include a distributed attenuator 164 coupled to a node 168 disposed between the amplifier 102 and the amplifier 104.

The variable attenuator 160, the distributed attenuator 162, and the distributed attenuator 164 may each compensate for a portion of the gain variation of the amplification circuitry 82 caused by a temperature change of the amplification circuitry 82. For example, the variable attenuator 160 may receive control signals. In some embodiments, the variable attenuator 160 (or the distributed attenuator 162 and/or 164) may receive the multi-bit control signals from the processor 12 to compensate for a gain variation of the amplifiers 104 and 106 (e.g., based on the temperature at the amplifier 104 and/or the amplifier 106) by adjusting the attenuation based on resistive switching. However, in other embodiments, the variable attenuator 160 may receive the control signals to compensate for a gain variation of only one of the amplifiers 104 or 106.

Moreover, the distributed attenuator 164 may receive control signals from the processor 12 to compensate for a gain variation of the amplifier 102 (e.g., based on the temperature at the amplifier 102). Furthermore, the distributed attenuator 162 may receive control signals from the processor 12 to compensate for a gain variation of the amplifier 100 and the passive elements 108 (e.g., based on the temperature at the amplifier 100 and/or the passive elements 108). Accordingly, each of the variable attenuator 160, the distributed attenuator 162, and the distributed attenuator 164 may compensate for a different portion of the gain variation of the amplification circuitry 82 based on their respective range of attenuation. In this manner, the variable attenuator 160, the distributed attenuator 162, and the distributed attenuator 164 may each compensate for a different portion of the gain variation of the amplification circuitry 82.

In some cases, the variable attenuator 160 may include a wider range of attenuation compared to the distributed attenuators 162 and 164. For example, in different cases, the variable attenuator 160 may compensate for 2, 3, 4, 5, 6, or more elements (e.g., amplifiers 100, 102, 104, and 106, and/or passive elements 108) of the amplification circuitry 82. In one example, the variable attenuator 160 may provide gain attenuation (e.g., gain decrease or dampening) of 5 dB or more, 10 dB or more, 15 dB or more, and so on. In some embodiments, the processor 12 may use the lookup table to provide the control signals to the variable attenuator 160, the distributed attenuator 162, and/or the distributed attenuator 164 based on the temperature. In one example, as temperature decreases, the gain variation of at least some of the elements of the amplification circuitry 82 may increase (e.g., each by 0.1 dB or greater, 0.5 dB or greater, 1.0 dB or greater, 1.5 dB or greater, and so on, from an initial or standard gain measured at a specific temperature). As such, the processor 12 may operate or cause the distributed attenuators 162 and 164 to each attenuate (e.g., decrease or dampen the power of) the signal 80 (e.g., by up to 1 dB or more, 2 dB or more, 3 dB or more, and so on) in response to the decreased temperature. Moreover, the processor 12 may operate or cause the variable attenuator 160 to attenuate the signal 80 (e.g., by up to 5 dB or more, 10 dB or more, 15 dB or more, and so on) in response to the decreased temperature.

With the foregoing in mind, the variable attenuator 160 may correlate to or match impedance of the amplification circuitry 82, provide a desirable frequency response (e.g., lower frequency droop), and/or provide lower gain attenuation error when attenuating the signal 80. Accordingly, the amplification circuitry 82 may use the combination of variable attenuators (e.g., the variable attenuator 220) and distributed attenuators (e.g., the distributed attenuators 222 and 224) to provide the signal 80 to the RF mixer 84, generally leveraging the advantages of each while mitigating the disadvantages of each. Although in the depicted embodiment, the variable attenuator 160 is coupled between the amplifier amplification and the RF mixer 84, the variable attenuator 160 may be disposed on a different node of the amplification circuitry 82. For example, in different embodiments, the variable attenuator 160 may be disposed on the node 166, the node 168, or a different node, in series with the cascaded amplifiers 100, 102, 104, and 106, and the passive elements 108.

Figure 7:
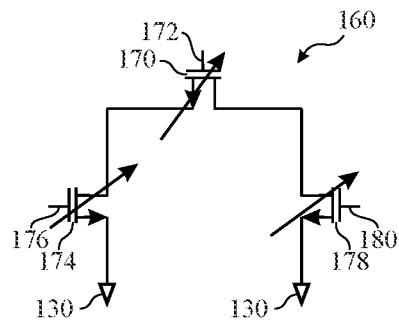
FIG. 7 is a circuit diagram of the variable attenuator of the amplification circuitry of FIG. 6, according to embodiments of the present disclosure.

FIG. 7 is a circuit diagram of the variable attenuator of the amplification circuitry of FIG. 6. As mentioned above, a variable attenuator may provide variable attenuation via variable resistors. In some cases, the variable attenuator may apply a dynamic range of attenuation (e.g., based on resistive switching) to compensate for the gain variations of the multiple amplifiers and transmission lines (or one amplifier) due to temperature. In different embodiments, the amplification circuitry 82 may use different circuits or implementations for the variable attenuator 160. In some cases, a first switch 170 (e.g., MOSFET, transistor, resistors, or other viable components) of the variable attenuator 160 may receive a series control signal 172 from the processor 12 (e.g., via an output of the amplifier 106 and/or an input of the RF mixer 84 of FIG. 6). That said, in different embodiments, the series control signal 172 of the variable attenuator 160 may receive the series control signal 172 via other cascaded elements (and/or nodes) of the amplification circuitry 82 (e.g., the amplifiers 100, 102, 104, and 106, and the passive elements 108).

The variable attenuator 160 may also include a second switch 174. The second switch 174 may receive a first shunt control signal 176. Moreover, the variable attenuator 160 may include a third switch 178. The third switch 178 may receive a second shunt control signal 180. In the depicted embodiment, the second switch 174 and the third switch 178 are coupled between the first switch 170 and the ground 130. In some cases, the first switch 170, the second switch 174, and/or the third switch 178 may be configurable to be conductive or non-conductive (e.g., using MOSFETs). Alternatively or additionally, the first switch 170, the second switch 174, and/or the third switch 178 may be configurable to provide a variable resistance (e.g., using variable resistance transistors).

In any case, the processor 12 may provide the first shunt control signal 176 to the second switch 174 and the second shunt control signal 180 to the third switch 178 (e.g., based on a received and/or determined temperature of the amplifiers 100, 102, 104, and/or 106, and/or the passive elements 108). Moreover, the processor 12 may use the look up table to determine the first shunt control signal 176 and the second shunt control signal 180 to provide to the switches 174, 178 based on temperature. In specific cases, the processor 12 may adjust the gain attenuation of the variable attenuator 160 by adjusting a variable resistance of the second switch 174, the third switch 178, or both.

Figure 8:
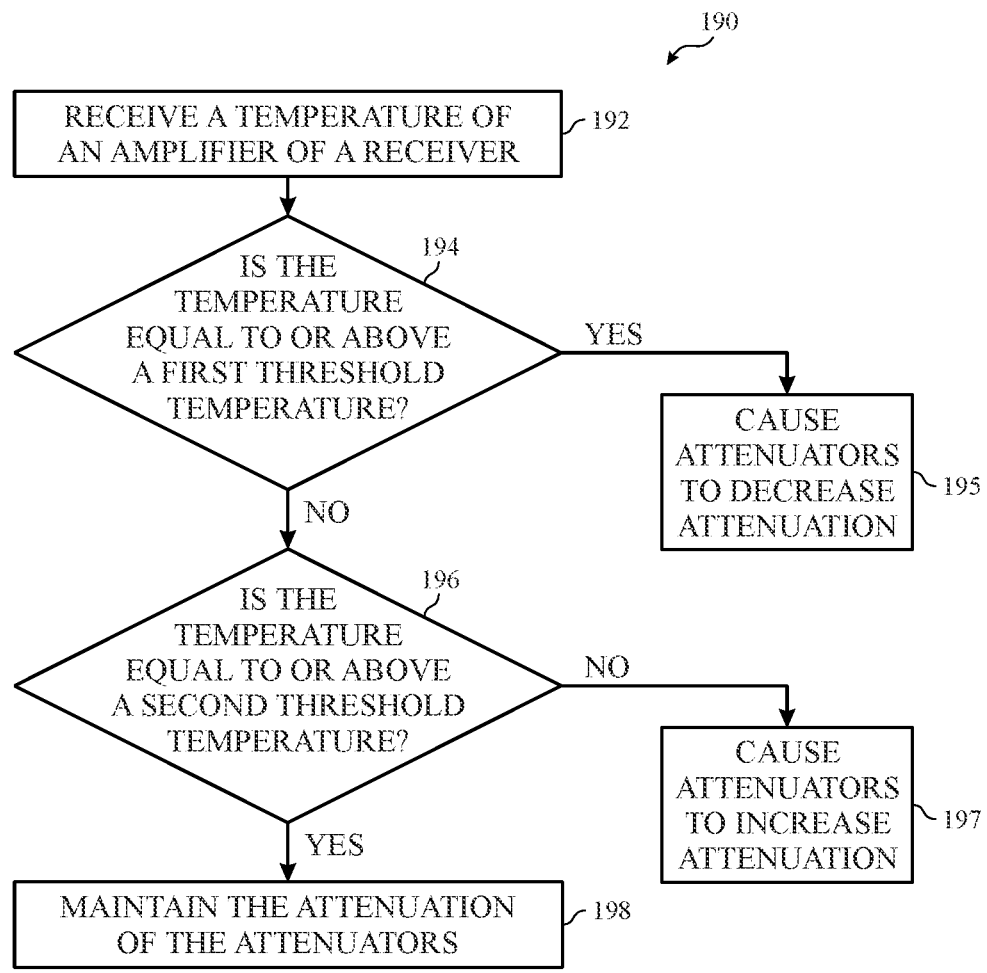
FIG. 8 is a flowchart of a process for attenuating a received RF signal to compensate for gain variations of the amplification circuitry of FIG. 4 or 6, according to embodiments of the present disclosure.

FIG. 8 is a flowchart of a process for attenuating a received RF signal to compensate for gain variations of the amplification circuitry of FIG. 4 or 6. The method 190 may facilitate compensating for the gain variations at different nodes of the receiver 54 using distributed attenuators. Any suitable device (e.g., the controller circuitry) that may control components of the electronic device 10, such as the processor 12, may perform the method 190.

For example, the processor 12 may use the method 190 to provide control signals to the distributed attenuator 110, 112, 114, 116, and/or 118 of FIG. 4, the variable attenuator 160 of FIG. 6, and/or the distributed attenuators 162 and 164 of FIG. 6. Accordingly, the processor 12 may use the method 190 to compensate for the gain variation of the amplifiers 100, 102, 104, and/or 108, and/or the passive elements 108 due to temperature variation. In some embodiments, the method 190 may be implemented by executing instructions stored in a tangible, non-transitory, computer-readable medium, such as the memory 14 or storage 16, using the processor 12. For example, the method 190 may be performed at least in part by one or more software components, such as an operating system of the electronic device 10, one or more software applications of the electronic device 10, and the like.

While the method 190 is described using steps in a specific sequence, it should be understood that the present disclosure contemplates that the described steps may be performed in different sequences than the sequence illustrated, and certain described steps may be skipped or not performed altogether. For example, although the method 190 is described with respect to the amplifier 100, it should be appreciated that in additional or alternative cases, the method 190 may be similarly used for the amplifiers 102, 104, 106, the passive elements 108, and/or a combination of such elements of the amplification circuitry 82.

In process block 192, the processor 12 receives a temperature of the amplifier 100. In some cases, the processor 12 may determine the temperature based on receiving one or more temperature measurements (e.g., from a temperature sensor) associated with the amplifier 100. In process block 194, the processor 12 determines whether the temperature of the amplifier 100 is equal to or above a threshold temperature. As mentioned above, higher temperature (e.g., than an initial or standard temperature) may cause a negative gain variation and a decreased total gain of the amplifier 100. As such, in some cases, the threshold temperature may correspond to a temperature at which the amplifier 100 operates with a threshold low gain. For example, the threshold low gain may correspond to a low (e.g., minimum) total gain of the amplifier 100 when the amplifier 100 exhibits a high (e.g., maximum) negative gain variation.

In process block 196, the processor 12 causes (e.g., by sending one or more control signals) one or more distributed attenuators and/or a variable attenuator to decrease gain attenuation (e.g., perform less gain attenuation) when the temperature of the amplifier 100 is equal to or above the threshold temperature. The one or more distributed attenuators may include the distributed attenuators 110, 112, 114, 116, 118, 162, and/or 164, and the variable attenuator may include the variable attenuator 160 described above. Moreover, in one example, the processor 12 may provide one or more control signals to idle at least one distributed attenuator and/or variable attenuator when the temperature of the amplifier 100 is equal to or above the threshold temperature (e.g., such that the gain provided by the one or more distributed attenuators and/or the variable attenuator is 0 dB).

In specific cases, one or more of the distributed attenuators 110, 112, 114, 116, 118, 162, and/or 164, and/or the variable attenuator 160 may provide low (e.g., minimum) attenuation (e.g., 0 dB, near 0 dB) to the signal 80 when the temperature of the amplifier 100 is equal to or above the threshold temperature. However, the processor 12 may also consider the temperature of the other amplifiers 102, 104, 106, and/or the passive elements 108 for providing the control signals for gain attenuation of the one or more of the distributed attenuators 110, 112, 114, 116, 118, 162, and/or 164, and/or the variable attenuator 160. For example, a first distributed attenuator 110, 112, 114, 116, 118, 162, or 164 may receive the control signals to provide low (e.g., minimum) attenuation based on a low temperature (e.g., minimum) of one or more associated amplifiers 102, 104, 106, and/or the passive elements 108. Moreover, a second distributed attenuator 110, 112, 114, 116, 118, 162, or 164 may receive the control signals to provide higher attenuation based on a higher temperature of one or more associated amplifiers 102, 104, 106, and/or the passive elements 108 of the second distributed attenuator 110, 112, 114, 116, 118, 162, or 164.

Moreover, in process block 198, the processor 12 causes (e.g., by sending one or more control signals) the one or more distributed attenuators, and/or the variable attenuator to compensate for gain variation of the amplifier 100 when the temperature of the amplifier 100 is below the threshold temperature. As mentioned above, the gain variation of the amplifier 100 may increase when the temperature of the amplifier 100 decreases. As such, the total gain of the amplifier 100 may increase when the temperature of the amplifier 100 decreases. Accordingly, in some cases, the processor 12 may cause the distributed attenuators 110, 112, 114, 116, 118, 162, and/or 164, and/or the variable attenuator 160 to attenuate the signal 80 when the temperature of the amplifier 100 is below the threshold temperature. In some cases, one of the distributed attenuators 110, 112, 114, 116, 118, 162, and/or 164 may compensate for the positive gain variation of the amplifier 100. In alternative or additional cases, the variable attenuator 160, and/or a combination of the distributed attenuators 110, 112, 114, 116, 118, 162, and/or 164, and/or the variable attenuator 160 may compensate for the positive gain variation of the amplifier 100.

In some embodiments, the processor 12 provides the control signals to cause the one or more of the distributed attenuators 110, 112, 114, 116, 118, 162, and/or 164, and/or the variable attenuator 160 to apply a different amount of attenuation based on the temperature. For example, the processor 12 may provide different control signals to compensate for gain variations of the amplifier 100 having different temperatures. In some embodiments, the processor 12 may cause one of the distributed attenuators 110, 112, 114, 116, 118, 162, and 164, and the variable attenuator 160 to apply a different amount of attenuation than another one of the distributed attenuators 110, 112, 114, 116, 118, 162, and 164, and the variable attenuator 160 due to different temperatures at these respective components. The processor 12 may provide the control signals to cause higher gain attenuation as the temperature decreases. In some cases, the processor 12 may use the lookup table, mentioned above and discussed below, to provide such control signals.

Figure 9:
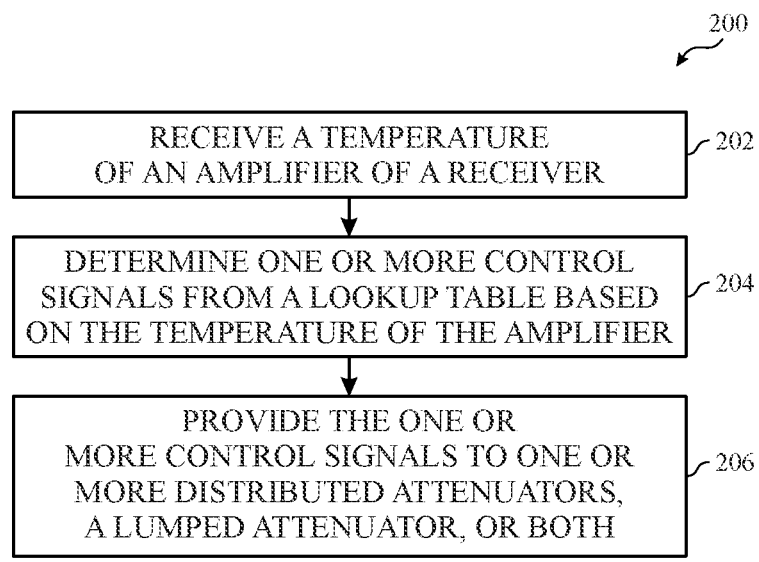
FIG. 9 is a flowchart of a process for attenuating a received RF signal to compensate for gain variations of the amplification circuitry of FIG. 4 or 6 based on using a lookup table, according to embodiments of the present disclosure.

FIG. 9 is another flowchart of a method 200 for the electronic device 10 to amplify the signal 80 independently from the gain variations of the amplifiers 100, 102, 104, and/or 106, and/or the passive elements 108 caused by a temperature change, according to embodiments of the present disclosure. The method 200 may facilitate compensating for the gain variations at different nodes of the receiver 54 using distributed attenuators. Similar to the method 190 described above, the method 200 may use the distributed attenuator 110, 112, 114, 116, 118, 162, and/or 164, and/or the variable attenuator 160 to compensate for the gain variation of the amplifier 100.

Any suitable device (e.g., the controller circuitry) that may control components of the electronic device 10, such as the processor 12, may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating system of the electronic device 10, one or more software applications of the electronic device 10, and the like. While the method 200 is described using steps in a specific sequence, it should be understood that the present disclosure contemplates that the described steps may be performed in different sequences than the sequence illustrated, and certain described steps may be skipped or not performed altogether.

At process block 202, the processor 12 receives a temperature of the amplifier 100. In some cases, the processor 12 may determine the temperature based on receiving one or more temperature measurements (e.g., from a temperature sensor) associated with the amplifier 100. At process block 204, the processor 12 determines one or more control signals from a lookup table based on the temperature of the amplifier 100.

In some cases, the lookup table may include specific set of attenuation values for different amplifiers 100, 102, 104, and/or 106 and/or the passive elements 108. In additional or alternative cases, the electronic device 10 may include multiple lookup tables associated with the different amplifiers 100, 102, 104, and/or 106 and/or the passive elements 108. The memory 14 and/or storage 16 may store the one or multiple lookup tables. Moreover, the lookup table may include attenuation values to compensate for the gain variations at different nodes 120, 122, 124, 126, and/or 128 of the amplification circuitry 82 at different temperatures using the distributed attenuators 110, 112, 114, 116, and/or 118.

Subsequently, at process block 206, the processor 12 provides the one or more control signals to one or more of the distributed attenuator 110, 112, 114, 116, 118, 162, and/or 164, and/or the variable attenuator 160, or a combination thereof. Accordingly, the amplification circuitry 82 of the electronic device 10 may amplify the signal 80 by compensating for the gain variations of the amplifiers 100, 102, 104, and/or 106, and/or the passive elements 108 caused by a temperature change.

In different embodiments, the receiver 54 may include different combinations of distributed attenuator and/or variable attenuators, such as the embodiments of FIGS. 4 and 6 discussed above, to compensate for the gain variations of the amplification circuitry 82 caused by temperature using distributed attenuators (e.g., the distributed attenuator 110, 112, 114, 116, 118, 162, and/or 164).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
   an antenna configured to receive a radio frequency signal;
   a plurality of amplifiers arranged in series along a transmission line and coupled to the antenna, each amplifier of the plurality of amplifiers having a gain and a gain variation based on a temperature;
   a phase shifter coupled in series to at least one amplifier of the plurality of amplifiers along the transmission line, the phase shifter having a gain variation based on the temperature;
   a first attenuator coupled to a first amplifier of the plurality of amplifiers or the phase shifter, the first attenuator being configured to attenuate the radio frequency signal based on the temperature to compensate for at least a portion of a cumulative gain variation of the plurality of amplifiers and the phase shifter based on the temperature.

2. The electronic device of claim 1, wherein the first attenuator is coupled between the transmission line and a ground.

3. The electronic device of claim 1, wherein the first attenuator comprises a first dynamic range of gain attenuation and is configured to attenuate the radio frequency signal based on the first dynamic range of gain attenuation to compensate for at least the portion of the cumulative gain variation caused by the first amplifier.

4. The electronic device of claim 3, comprising a second attenuator coupled in series with at least a second amplifier of the plurality of amplifiers, the second attenuator comprising a second dynamic range of gain attenuation higher than the first dynamic range of gain attenuation, and the second attenuator configured to attenuate the radio frequency signal based on the second dynamic range of gain attenuation to compensate for at least a second portion of the cumulative gain variation caused by the second amplifier.

5. The electronic device of claim 4, wherein a fourth third attenuator comprises a third dynamic range of gain attenuation lower than the second dynamic range of gain attenuation, the third attenuator configured to attenuate the radio frequency signal based on the third dynamic range of gain attenuation to compensate for at least a third portion of the cumulative gain variation caused by the first amplifier, the second amplifier, and the transmission line.

6. The electronic device of claim 1, wherein the first attenuator is differentially coupled to the transmission line.

7. The electronic device of claim 1, further comprising controller circuitry configured to provide one or more control signals to the first attenuator to attenuate the radio frequency signal based on the temperature.

8. The electronic device of claim 7, wherein the first attenuator each comprises a plurality of field-effect transistor switches configured to receive the one or more control signals to attenuate the radio frequency signal based on the temperature.

9. The electronic device of claim 8, wherein the one or more control signals causes at least one of the plurality of field-effect transistor switches to
partially activate to apply a first attenuation based on a dynamic range of gain attenuation of the first attenuator, or
fully activate to apply a second attenuation higher than the first attenuation based on the dynamic range of gain attenuation of the first attenuator.

10. Radio frequency receiver circuitry comprising:
a plurality of amplifiers coupled in series;
a phase shifter coupled in series to at least one amplifier of the plurality of amplifiers, the plurality of amplifiers and the phase shifter having a cumulative gain comprising a sum of each gain of each amplifier of the plurality of amplifiers and the phase shifter, and the plurality of amplifiers and the phase shifter having a cumulative gain variation comprising a sum of each gain variation of each amplifier of the plurality of amplifiers and the phase shifter, the cumulative gain and the cumulative gain variation varying with temperature; and
a plurality of distributed attenuators each coupled to at least one amplifier of the plurality of amplifiers or the phase shifter, each distributed attenuator of the plurality of distributed attenuators configured to compensate for a respective portion of the cumulative gain variation.

11. The radio frequency receiver circuitry of claim 10, further comprising a variable attenuator coupled in series to at least one amplifier of the plurality of amplifiers, the variable attenuator configured to compensate for a portion of the cumulative gain variation higher than the respective portion of the cumulative gain variation compensated for by each distributed attenuator of the plurality of distributed attenuators.

12. The radio frequency receiver circuitry of claim 10, wherein the plurality of distributed attenuators is configured to receive one or more signals based on the temperature, wherein each distributed attenuator of the plurality of distributed attenuators compensates for the respective portion of the cumulative gain variation based on the one or more signals.

13. The radio frequency receiver circuitry of claim 10, wherein a first distributed attenuator of the plurality of distributed attenuators is coupled in series to a first amplifier of the plurality of amplifiers, the first distributed attenuator being configured to compensate for a gain variation of the first amplifier based on the temperature.

14. The radio frequency receiver circuitry of claim 10, wherein an increase in the temperature is associated with a negative gain variation of each of the plurality of amplifiers and a decrease in the temperature is associated with a positive gain variation of each of the plurality of amplifiers.

15. A method comprising:
receiving, at a radio frequency receiver circuitry, an input signal;
receiving, at processing circuitry of the radio frequency receiver circuitry, a temperature of one or more of a plurality of amplifiers or a phase shifter of the radio frequency receiver circuitry, the plurality of amplifiers being coupled in series, the phase shifter being coupled to at least one amplifier of the plurality of amplifiers, each amplifier of the plurality of amplifiers and the phase shifter having a gain variation based on the temperature;
providing, by the processing circuitry, one or more control signals to adjust a gain attenuation of a first distributed attenuator of a plurality of distributed attenuators, the first distributed attenuator being coupled to a first amplifier of the plurality of amplifiers or the phase shifter to compensate for a portion of a cumulative gain variation of the plurality of amplifiers and the phase shifter, the cumulative gain variation comprising a sum of gain variations of the plurality of amplifiers and the phase shifter based on the temperature;
applying, by the first distributed attenuator, the gain attenuation to the input signal based on the one or more control signals; and
transmitting, by the receiver, the input signal to the processing circuitry.

16. The method of claim 15, wherein each of the plurality of distributed attenuators comprises a dynamic range of gain attenuation associated with compensating for an increased gain of a respective amplifier of the plurality of amplifiers.

17. The method of claim 16, comprising providing, by the processing circuitry, the one or more control signals to increase a gain attenuation of the first distributed attenuator of or a lumped attenuator of the radio frequency receiver circuitry to compensate for an increased gain of the first amplifier based on the temperature of the one or more of the plurality of amplifiers being below a temperature threshold, the lumped attenuator having a higher range of gain attenuation compared to the dynamic range of gain attenuation of each of the plurality of distributed attenuators.

18. The method of claim 15, comprising providing, by the processing circuitry, the one or more control signals to idle the first distributed attenuator of based on a decreased gain of the first amplifier of the plurality of amplifiers based on the temperature of the one or more of the plurality of amplifiers being equal to or above a temperature threshold.

19. The method of claim 15, comprising
   receiving, by the processing circuitry, a plurality of temperatures of the plurality of amplifiers or the phase shifter subsequent to receiving the temperature,
   determining, by the processing circuitry, that a second temperature associated with the first amplifier is increased based on receiving the plurality of temperatures, and
   providing, by the processing circuitry, one or more additional control signals to decrease gain attenuation of the first distributed attenuator o based on the second temperature.

20. The method of claim 15, comprising referencing a lookup table, by the processing circuitry, to generate the one or more control signals based on the temperature.

\* \* \* \* \*